United States Patent
Okuda

(10) Patent No.: US 10,336,574 B2
(45) Date of Patent: Jul. 2, 2019

(54) ELEVATOR OPERATION PANEL

(71) Applicant: MITSUBISHI ELECTRIC CORPORATION, Chiyoda-ku (JP)

(72) Inventor: Hiroshi Okuda, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 56 days.

(21) Appl. No.: 15/536,439

(22) PCT Filed: Mar. 3, 2015

(86) PCT No.: PCT/JP2015/056205
§ 371 (c)(1),
(2) Date: Jun. 15, 2017

(87) PCT Pub. No.: WO2016/139750
PCT Pub. Date: Sep. 9, 2016

(65) Prior Publication Data
US 2017/0327343 A1 Nov. 16, 2017

(51) Int. Cl.
*B66B 1/34* (2006.01)
*B66B 1/46* (2006.01)
(Continued)

(52) U.S. Cl.
CPC ............ *B66B 1/3469* (2013.01); *B66B 1/461* (2013.01); *B66B 2201/00* (2013.01); *H02B 1/06* (2013.01); *H05K 5/02* (2013.01)

(58) Field of Classification Search
CPC ....... B66B 1/3469; B66B 1/461; H02B 1/015; H02B 1/041
See application file for complete search history.

(56) References Cited

U.S. PATENT DOCUMENTS 2,998,500 A * 8/1961 Di Carlo ............... B66B 1/3469
187/395
5,216,576 A * 6/1993 Dilko ..................... H02B 1/015
361/641
(Continued)

FOREIGN PATENT DOCUMENTS

JP 57-178062 U 11/1982
JP 61-291385 A 12/1986
(Continued)

OTHER PUBLICATIONS

International Search Report dated Jun. 2, 2015, in PCT/JP2015/056205 filed Mar. 3, 2015.
(Continued)

*Primary Examiner* — Michael A Riegelman
(74) *Attorney, Agent, or Firm* — Xsensus LLP

(57) ABSTRACT

In an elevator operation panel, a front part of a casing includes a frame body and a front surface plate. The frame body includes a first vertical frame and a second vertical frame. A fixing member is laid across the first vertical frame and the second vertical frame. A holding member for holding the front surface plate on the frame body is fixed to the fixing member. The holding member includes a holding portion that overlaps a vertical direction end portion of a front surface of the front surface plate, and a fastening portion that projects rearward from the holding portion and is screwed to the fixing member.

16 Claims, 8 Drawing Sheets

(51) Int. Cl.
  *H02B 1/06*     (2006.01)
  *H05K 5/02*     (2006.01)

(56) References Cited

U.S. PATENT DOCUMENTS

| | | | | |
|---|---|---|---|---|
| 5,463,533 | A * | 10/1995 | Donnerstag | H02B 1/015 |
| | | | | 174/57 |
| 6,302,240 | B1 * | 10/2001 | Shih | B66B 1/461 |
| | | | | 187/397 |
| 2011/0024240 | A1 * | 2/2011 | Rusanen | B66B 1/461 |
| | | | | 187/395 |
| 2016/0352080 | A1 * | 12/2016 | Brueck | H02B 1/013 |
| 2017/0362053 | A1 * | 12/2017 | Okuda | B66B 11/02 |
| 2018/0105395 | A1 * | 4/2018 | Cortes | B66B 5/0087 |
| 2018/0111796 | A1 * | 4/2018 | Peigne | B66B 1/14 |

FOREIGN PATENT DOCUMENTS

| | | |
|---|---|---|
| JP | 64-29368 U | 2/1989 |
| JP | 5-92878 A | 4/1993 |
| JP | 6-16348 A | 1/1994 |
| JP | 6-17816 | 5/1994 |
| JP | 9-315711 A | 12/1997 |
| JP | 2011-246205 A | 12/2011 |

OTHER PUBLICATIONS

Notification of Reason for Refusal issued in Korean Application 10-2017-7027057 dated Dec. 14, 2018.

\* cited by examiner

ELEVATOR OPERATION PANEL

TECHNICAL FIELD

This invention relates to an elevator operation panel, such as a car operation panel provided inside a cage or a landing operation panel provided on a landing, for example.

BACKGROUND ART

In a conventional car operation panel for an elevator, a plurality of stud screws are welded to a rear surface of a decorative plate. A plate material having a thickness of 3 mm is used as the decorative plate so that a front surface thereof is not affected by the stud welding (see PTL 1, for example).

Further, in a conventional landing operation panel for an elevator, upper and lower end portions of a face board are bent at a right angle toward a landing wall side and screwed to a mounting plate fixed to the landing wall (see PTL 2, for example).

CITATION LIST

Patent Literature

[PTL 1] Japanese Patent Application Publication No. H6-16348
[PTL 2] Japanese Patent Application Publication No. H9-315711

SUMMARY OF THE INVENTION

Problem to be Solved by the Invention

In the conventional car operation panel disclosed in PTL 1, the plate thickness of the decorative plate must be increased to prevent welding marks from forming on the front surface thereof.

In the conventional landing operation panel disclosed in PTL 2, processing such as bending must be implemented on the face board that serves as a design material exposed to the outside. Moreover, to ensure that the face board is strong enough, either the plate thickness of the face board must be increased or a separate reinforcing member must be added thereto.

This invention has been designed to solve the problems described above, and an object thereof is to obtain an elevator operation panel with which the plate thickness of a front surface plate can be reduced while preventing welding marks from forming on the front surface plate.

Means for Solving the Problem

An elevator operation panel according to this invention includes a casing having a rear part and a front part that is joined to the rear part, wherein the front part includes a frame body and a front surface plate disposed on an opposite side of the frame body to the rear part, the frame body includes a first vertical frame disposed on one width direction side and a second vertical frame disposed on another width direction side, a fixing member is laid across the first vertical frame and the second vertical frame, a holding member for holding the front surface plate on the frame body is fixed to the fixing member, and the holding member includes a holding portion that overlaps a vertical direction end portion of a front surface of the front surface plate, and a fastening portion that projects rearward from the holding portion and is screwed to the fixing member.

Further, an elevator operation panel according to this invention includes: a casing having a rear part and a front part that is joined to the rear part; and an operation panel device provided in the casing, wherein the front part includes a frame body and a front surface plate disposed on an opposite side of the frame body to the rear part, the frame body includes a first vertical frame disposed on one width direction side and a second vertical frame disposed on another width direction side, a fixing member is laid across the first vertical frame and the second vertical frame, the operation panel device is mounted on the fixing member, a screw member holding groove is provided in each of the first and second vertical frames, a first screw member is held in each of the screw member holding grooves, and the fixing member is fixed to the first and second vertical frames by fastening a second screw member to each of the first screw members.

Effects of the Invention

With the elevator operation panel according to this invention, the plate thickness of the front surface plate can be reduced while preventing welding marks from forming on the front surface plate.

DESCRIPTION OF EMBODIMENTS

Embodiments of this invention will be described below with reference to the drawings.

First Embodiment

Figure 1:
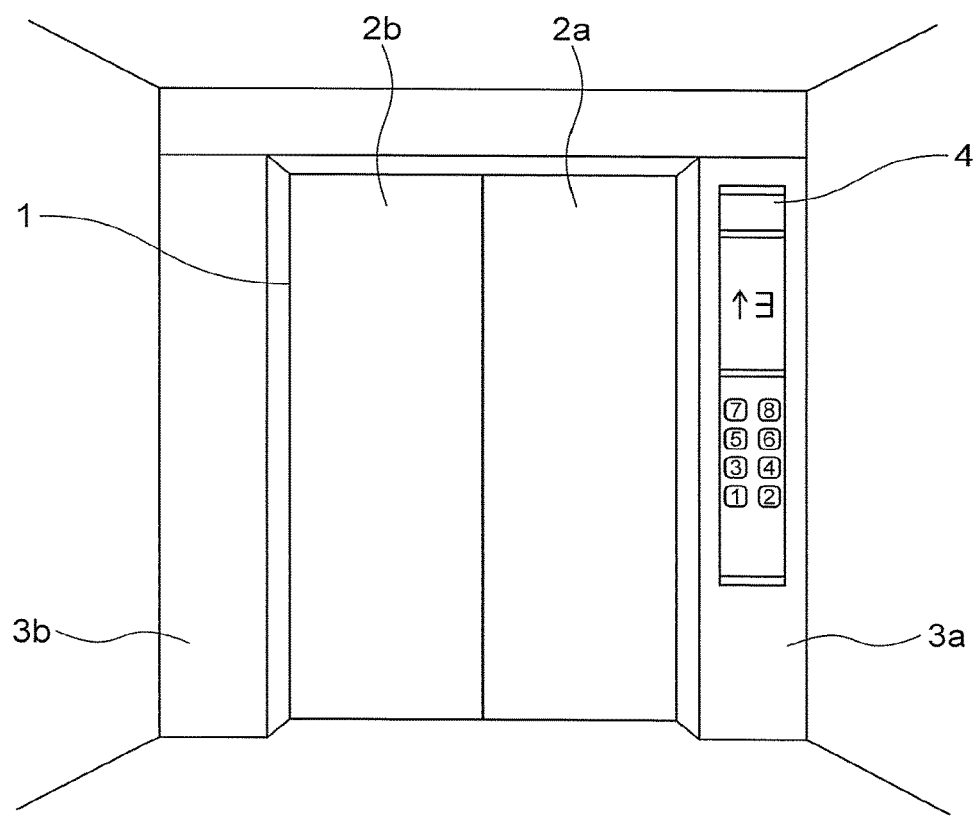
FIG. 1 is a front view showing an arrangement of a car operation panel for an elevator according to a first embodiment of this invention.

FIG. 1 is a front view showing an arrangement of a car operation panel for an elevator according to a first embodiment of this invention. In the drawing, a pair of car doors 2*a*, 2*b* for opening and closing a car doorway 1 are provided on a front surface of a cage. A pair of wing walls 3*a*, 3*b* are provided on respective sides of the car doorway 1. A car operation panel 4 is fixed to the wing wall 3*a*.

Figure 2:
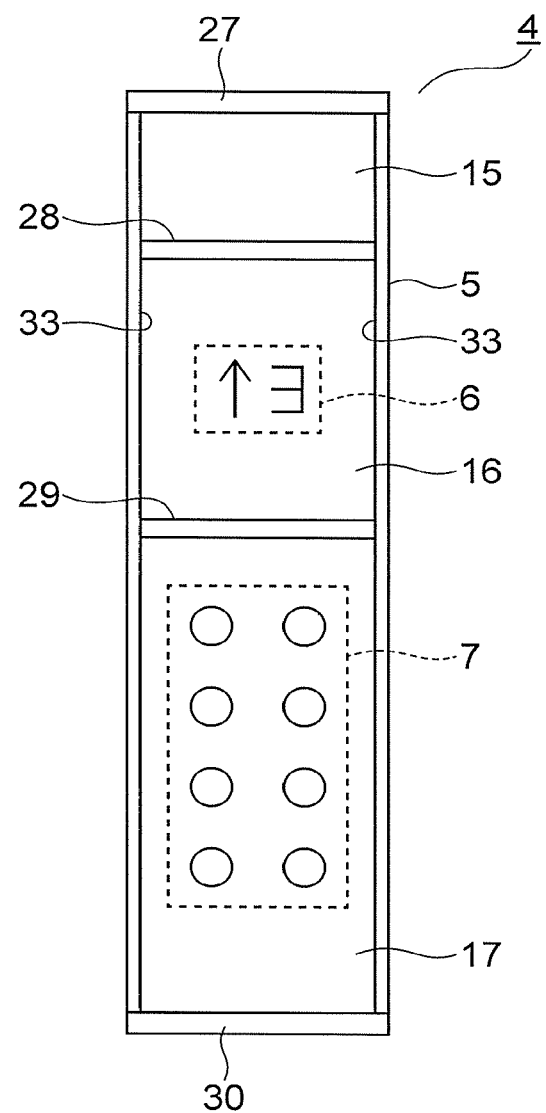
FIG. 2 is an enlarged front view showing the car operation panel of FIG. 1.

FIG. 2 is an enlarged front view showing the car operation panel 4 of FIG. 1. The car operation panel 4 includes a casing 5 and a plurality of operation panel devices incorporated into the casing 5. The operation panel devices include an indicator 6, a car operating button device 7, a control box (not shown), and so on. An LED indicator, for example, is used as the indicator 6. A plurality of destination floor specifying buttons that are operated from inside the cage are provided in the car operating button device 7.

The casing 5 has a thin, vertically long outer shape in which a height dimension (a dimension in a vertical direction of FIG. 2) is larger than a width dimension (a dimension in a left-right direction of FIG. 2) and a thickness dimension (a dimension in a left-right direction of FIG. 3) is smaller than the width dimension.

Figure 3:
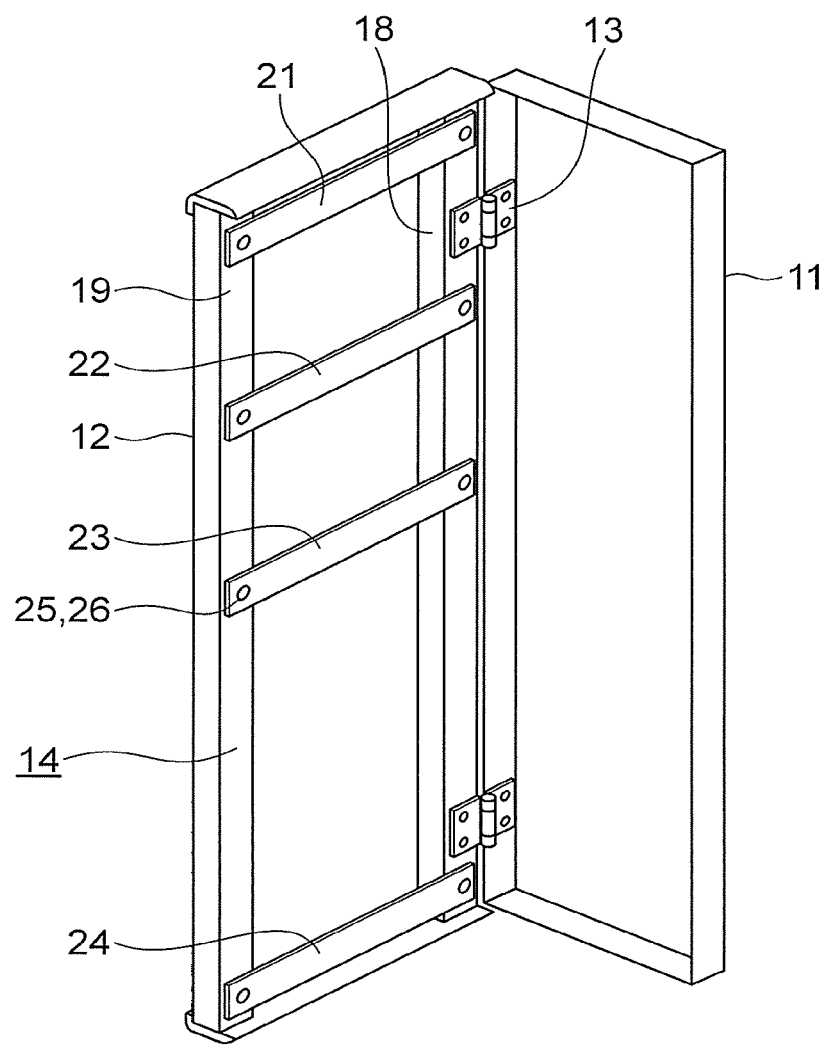
FIG. 3 is a schematic perspective view showing a casing of FIG. 2 in an open condition.

FIG. 3 is a schematic perspective view showing the casing 5 of FIG. 2 in an open condition. The operation panel devices have been omitted from FIG. 3. The casing 5 includes a rear part 11 fixed to the wing wall 3*a*, and a front part 12 joined to the rear part 11. The front part 12 is connected to the rear part 11 on one width direction side thereof so as to be capable of rotating about a plurality of hinges 13.

Figure 4:
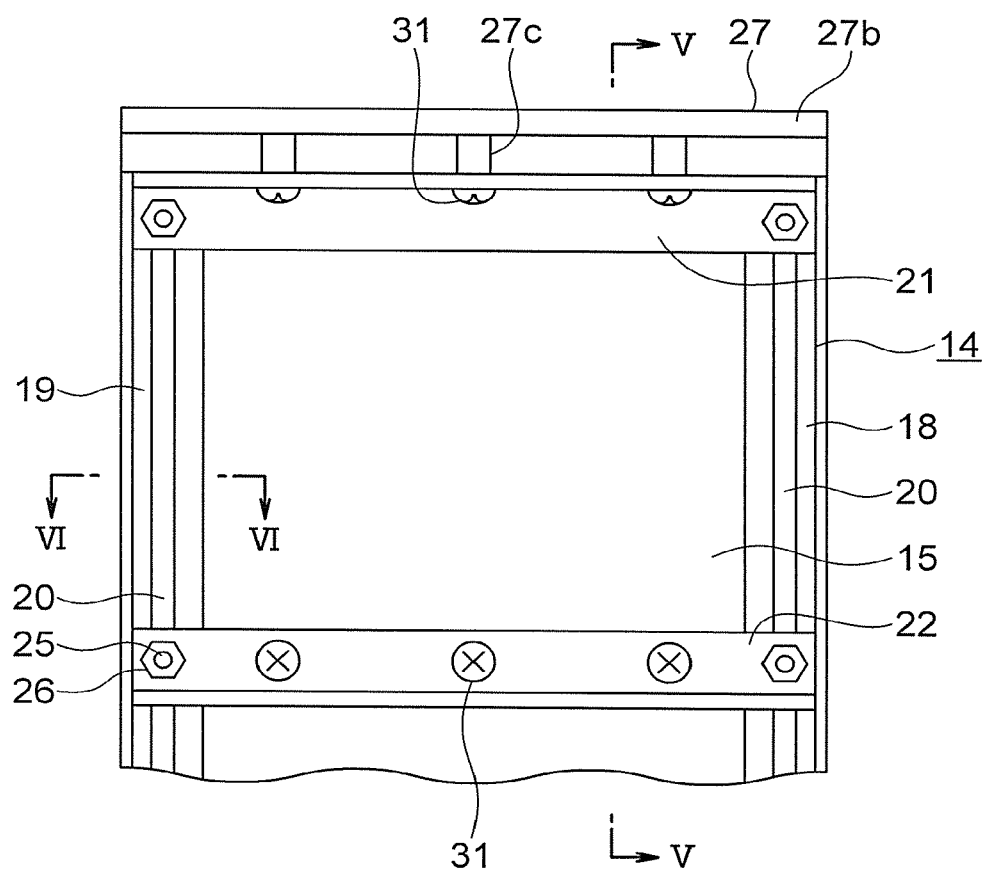
FIG. 4 is a partial enlarged back view of a front part of FIG. 3.
Figure 5:
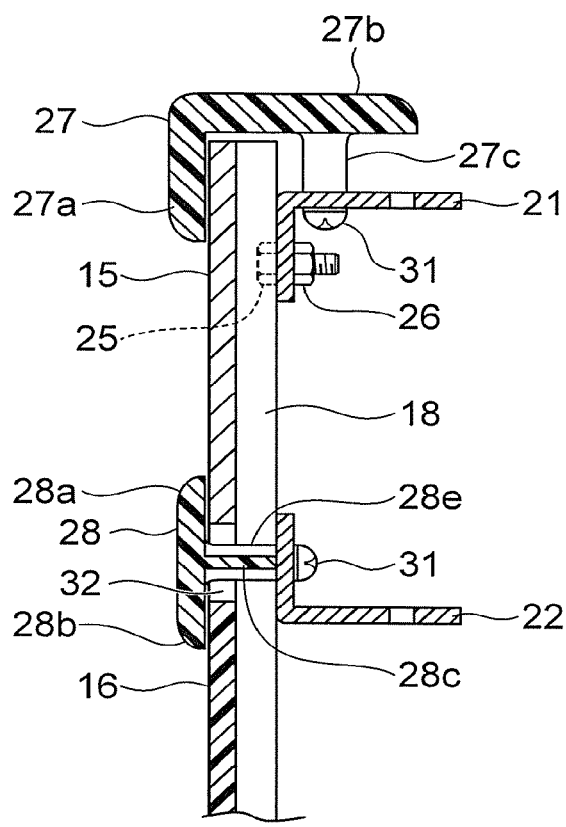
FIG. 5 is a sectional view taken along a V-V line in FIG. 4.
Figure 6:
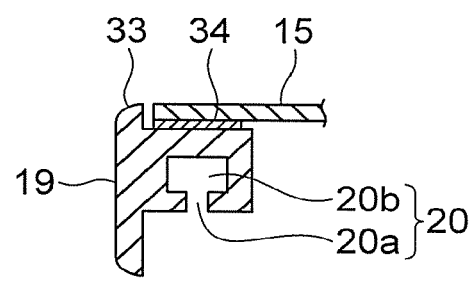
FIG. 6 is a sectional view taken along a VI-VI line in FIG. 4.

FIG. 4 is a partial enlarged back view of the front part 12 of FIG. 3. FIG. 5 is a sectional view taken along a V-V line in FIG. 4. FIG. 6 is a sectional view taken along a VI-VI line in FIG. 4. The front part 12 includes a frame body 14, and first to third front surface plates 15, 16, 17 disposed on an opposite side of the frame body 14 to the rear part 11. The second front surface plate 16 is disposed on a lower side of the first front surface plate 15. As shown in FIG. 2, the third front surface plate 17 is disposed on a lower side of the second front surface plate 16.

The first to third front surface plates 15, 16, 17 all have rectangular front surface shapes. Flat metal plates are used as the first and third front surface plates 15, 17. A flat resin plate that transmits light is used as the second front surface plate 16.

The frame body 14 includes a first vertical frame 18 made of metal and disposed on one width direction side of the front part 12, and a second vertical frame 19 made of metal and disposed on another width direction side of the front part 12. The first and second vertical frames 18, 19 are disposed parallel to each other. FIG. 6 shows a horizontal sectional shape of the second vertical frame 19, and the horizontal sectional shape of the first vertical frame 18 exhibits left-right symmetry thereto.

Screw member holding grooves 20 are provided respectively in the first and second vertical frames 18, 19. The screw member holding grooves 20 are provided continuously over a length direction, or in other words a vertical direction, of the first and second vertical frames 18, 19.

Further, as shown in FIG. 6, the screw member holding groove 20 includes an opening portion 20*a* facing the rear part 11, and a back portion 20*b* positioned on the opposite side of the opening portion 20*a* to the rear part 11. A width dimension (a dimension in a left-right direction of FIG. 6) of the opening portion 20*a* is smaller than a width dimension of the back portion 20*b*.

First to fourth fixing members 21, 22, 23, 24 are laid across the first vertical frame 18 and the second vertical frame 19. The first to fourth fixing members 21, 22, 23, 24 are metal members having an L-shaped cross-section. Further, the first to fourth fixing members 21, 22, 23, 24 are disposed parallel to each other and horizontally, or in other words at right angles to the first and second vertical frames 18, 19. The operation panel devices are mounted on the fixing members 21, 22, 23, 24.

The first fixing member 21 is laid across respective upper end portions of the first and second vertical frames 18, 19. The second fixing member 22 is disposed below the first fixing member 21. As shown in FIG. 3, the third fixing member 23 is disposed below the second fixing member 22. The fourth fixing member 24 is laid across respective lower end portions of the first and second vertical frames 18, 19.

A plurality of hexagon bolts 25 serving as first screw members are held respectively in the screw member holding grooves 20. A head portion of each hexagon bolt 25 is housed in the back portion 20*b*. Further, a screw portion of each hexagon bolt 25 projects to the outside of the screw member holding groove 20 through the opening portion 20*a* so as to penetrate an end portion of the corresponding fixing member 21, 22, 23, or 24.

Nuts 26 serving as second screw members are fastened respectively to the hexagon bolts 25. As a result, the first to fourth fixing members 21, 22, 23, 24 are fixed to the first and second vertical frames 18, 19. Axial direction movement and rotation of the hexagon bolt 25 is restricted by an inner wall surface of the screw member holding groove 20. By loosening the fastening between the nut 26 and the hexagon bolt 25, the hexagon bolt 25 can slide through the screw member holding groove 20 in the vertical direction.

A first holding member 27 for holding an upper end portion of the first front surface plate 15 on the frame body 14 is fixed to the first fixing member 21. A second holding member 28 for holding a lower end portion of the first front surface plate 15 and an upper end portion of the second front surface plate 16 on the frame body 14 is fixed to the second fixing member 22.

A third holding member 29 for holding a lower end portion of the second front surface plate 16 and an upper end portion of the third front surface plate 17 on the frame body 14 is fixed to the third fixing member 23. A fourth holding member 30 for holding a lower end portion of the third front surface plate 17 on the frame body 14 is fixed to the fourth fixing member 24.

The first to fourth holding members 27, 28, 29, 30 are formed from resin. Each of the holding members 27, 28, 29, 30 is screwed to the corresponding fixing member 21, 22, 23, or 24 from the rear side of the front part 12 using a plurality of mounting screws 31.

The first and fourth holding members 27, 30 each have an L-shaped cross-section. The first holding member 27 doubles as an upper end cap of the frame body 14. The fourth holding member 30 is disposed in a vertically opposite orientation to the first holding member 27, and therefore doubles as a lower end cap of the frame body 14.

The first holding member 27 includes a holding portion 27*a* that overlaps an upper end portion of a front surface (a surface on the opposite side to the rear part 11) of the first front surface plate 15, and a fastening portion 27*b* that projects rearward (toward the rear part 11 side) from the holding portion 27*a* at a right angle, and is screwed to the first fixing member 21. A plurality of bosses 27*c* having screw holes are provided on the fastening portion 27*b*.

The fourth holding member 30 has an identical shape to the first holding member 27. More specifically, the fourth holding member 30 includes a holding portion that overlaps a lower end portion of a front surface of the third front surface plate 17, and a fastening portion that projects rearward from the holding portion at a right angle, and is screwed to the fourth fixing member 24.

The second and third holding members 28, 29 each have a T-shaped cross-section. The second holding member 28 includes a first holding portion 28a that overlaps a lower end portion of the front surface of the first front surface plate 15, a second holding portion 28b that overlaps an upper end portion of a front surface of the second front surface plate 16, and a fastening portion 28c that projects rearward from the first and second holding portions 28a, 28b at a right angle, and is screwed to the second fixing member 22.

Figure 7:
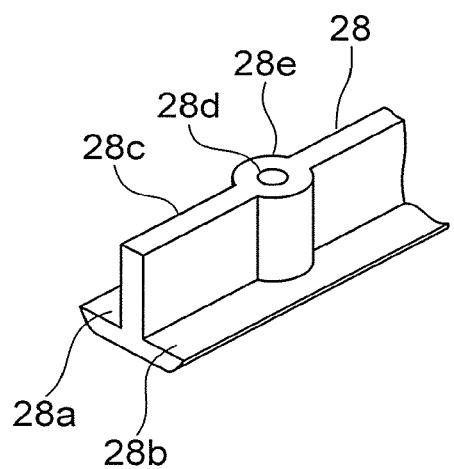
FIG. 7 is a perspective view showing main parts of a second holding member of FIG. 5.

FIG. 7 is a perspective view showing main parts of the second holding member 28 of FIG. 5. A plurality of bosses 28e having screw holes 28d are provided on the fastening portion 28c.

The third holding member 29 has an identical shape to the second holding member 28. More specifically, the third holding member 29 includes a first holding portion that overlaps a lower end portion of the front surface of the second front surface plate 16, a second holding portion that overlaps an upper end portion of the front surface of the third front surface plate 17, and a fastening portion that is screwed to the third fixing member 23.

As shown in FIG. 5, vertical direction gaps 32 are provided respectively between the second fastening portion 28c having the bosses 28e and the lower end portion of the first front surface plate 15 and the upper end portion of the second front surface plate 16. By providing the gaps 32, manufacturing errors and thermal expansion and contraction can be absorbed.

As shown in FIG. 6, a restricting projection 33 is provided on the first and second vertical frames 18, 19 to restrict width direction movement of the front surface plates 15, 16, 17. Further, a double-sided tape 34 is interposed respectively between the first and second vertical frames 18, 19 and the front surface plates 15, 16, 17.

In this operation panel 4 for an elevator, the fixing members 21, 22, 23, 24 are laid across the first vertical frame 18 and the second vertical frame 19, the holding members 27, 28, 29, 30 are screwed respectively to the fixing members 21, 22, 23, 24, and the front surface plates 15, 16, 17 are respectively held on the frame body 14 by the holding members 27, 28, 29, 30. Therefore, the front surface plates 15, 16, 17 do not have to be fixed by welding, and as a result, a plate thickness of the front surface plates 15, 16, 17 can be reduced (to 1 mm or less, for example) while preventing welding marks from forming on the front surface plates 15, 16, 17.

Further, the fixing members 21, 22, 23, 24 are fixed to the first and second vertical frames 18, 19 by fastening the second screw members respectively to the first screw members held in the screw member holding grooves of the first and second vertical frames, and the operation panel devices are mounted on the fixing members 21, 22, 23, 24. Therefore, the operation panel devices do not have to be mounted by welding, and as a result, the plate thickness of the front surface plates 15, 16, 17 can be reduced while preventing welding marks from forming on the front surface plates 15, 16, 17.

By reducing the plate thickness of the front surface plates 15, 16, 17 in this manner, the cost of a metal plate such as a stainless steel plate used as a design surface can be reduced. Moreover, single metal or resin plates can be used as the front surface plates 15, 16, 17 forming the design surface, and as a result, a processing time can be reduced.

Further, upper and lower edges of the front surface plates 15, 16, 17 can be covered by the holding members 27, 28, 29, 30.

Furthermore, the first holding portion 28a and the second holding portion 28b are provided on the second holding member 28, and therefore the second holding member 28 can restrain both the first and second front surface plates 15, 16, enabling a reduction in a number of components. Moreover, assembly can be achieved more easily.

Further, the restricting projections 33 are provided on the first and second vertical frames 18, 19, and therefore the front surface plates 15, 16, 17 can be prevented from shifting in the width direction without the need to restrain the front surface plates 15, 16, 17 firmly using the holding members 27, 28, 29, 30.

Furthermore, the front surface plates 15, 16, 17 are adhered to the first and second vertical frames 18, 19 by the double-sided tape 34, and therefore the front surface plates 15, 16, 17 can be fixed provisionally before fixing the holding members 27, 28, 29, 30 to the fixing members 21, 22, 23, 24. As a result, assembly can be achieved more easily. In addition, positional deviation of the front surface plates 15, 16, 17 can be prevented more reliably.

Moreover, axial direction movement and rotation of the hexagon bolt 25 is restricted by the screw member holding groove 20, and by loosening the fastening between the nut 26 and the hexagon bolt 25, the hexagon bolt 25 can slide through the screw member holding groove 20 in the vertical direction. As a result, vertical direction positions of the fixing members 22, 23, which are positioned in an intermediate part of the vertical direction, can be adjusted easily.

Second Embodiment

Figure 8:
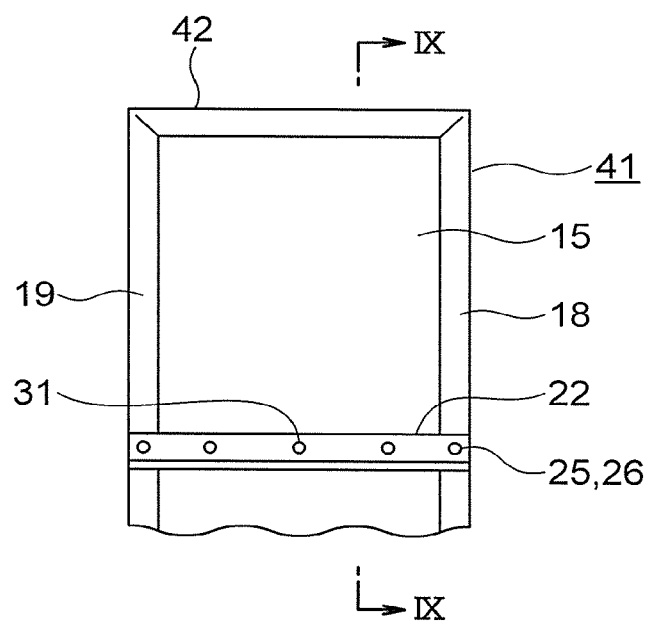
FIG. 8 is a back view showing main parts of a front part of an elevator operation panel according to a second embodiment of this invention.
Figure 9:
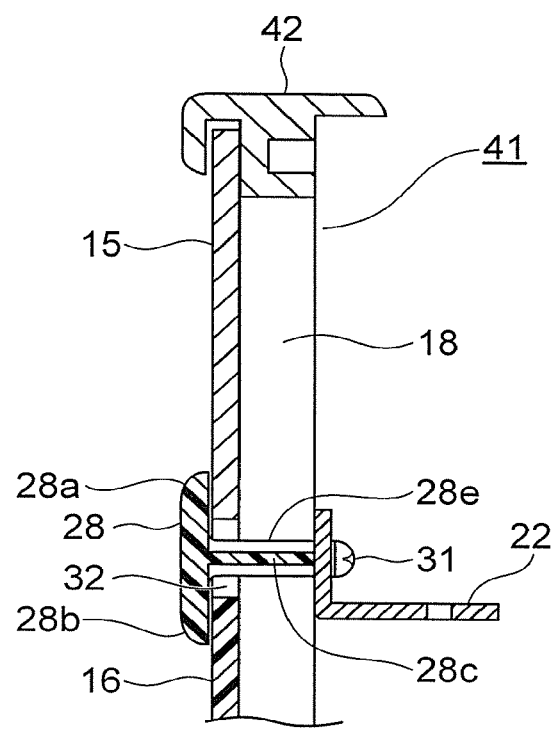
FIG. 9 is a sectional view taken along an IX-IX line in FIG. 8.

Next, FIG. 8 is a back view showing main parts of a front part of an elevator operation panel according to a second embodiment of this invention, and FIG. 9 is a sectional view taken along an IX-IX line in FIG. 8. The operation panel devices have been omitted from FIGS. 8 and 9. A frame body 41 according to the second embodiment includes the first and second vertical frames 18, 19, an upper frame 42, and a lower frame (not shown). The upper frame 42 is fixed between the respective upper end portions of the first and second vertical frames 18, 19. The lower frame is fixed between the respective lower end portions of the first and second vertical frames 18, 19.

An upper frame side holding portion 42a is provided on the upper frame 42 so as to overlap the upper end portion of the front surface of the first front surface plate 15. A lower frame side holding portion is provided on the lower frame so as to overlap the lower end portion of the front surface of the third front surface plate 17. All other configurations are similar or identical to the first embodiment.

Similar effects to the first embodiment can be obtained likewise when the frame body 41 is used.

Note that in the examples described above, the hexagon bolt 25 is used as the first screw member and the nut 26 is used as the second screw member, but instead, a nut may be used as the first screw member and a bolt may be used as the second screw member.

Further, the operation panel devices may be mounted on the fixing members to which the holding members are fixed, or may be mounted on different fixing members to the fixing members to which the holding members are fixed.

Furthermore, numbers and materials of the front surface plates, fixing members, holding members, and so on are not limited to the examples described above.

Moreover, in the examples described above, the rear part 11 and the front part 12 are connected by the hinges 13, but there are no particular limitations on the structure for joining the front part to the rear part, and a structure in which the front part is screwed to the rear part, for example, may be employed instead.

Figure 10:
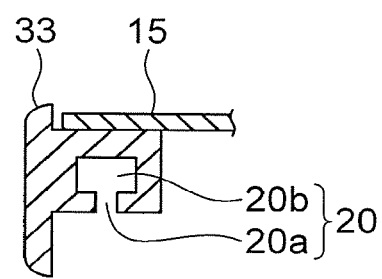
FIG. 10 is a sectional view showing a condition in which a double-sided tape of FIG. 6 has been omitted.

Further, in the examples described above, the double-sided tape 34 is interposed between the vertical frames 18, 19 and the front surface plates 15, 16, 17, but as shown in FIG. 10, the double-sided tape may be omitted.

Furthermore, when the front surface plates can be restrained firmly by the holding members, the restricting projections 33 may be omitted.

Figure 11:
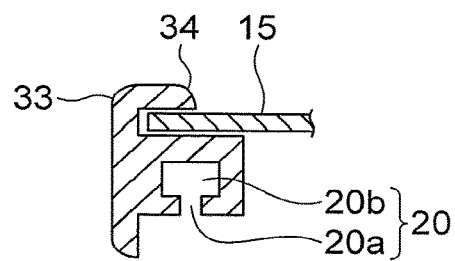
FIG. 11 is a sectional view showing a modified example of a vertical frame of FIG. 6.

Moreover, as shown in FIG. 11, holding projections 35 that project inward in the width direction of the casing 5 from respective tip ends of the restricting projections 33 may be provided. As a result, the front surface plates can be held on the frame body more reliably.

Figure 12:
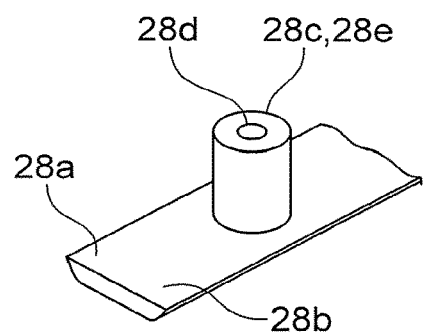
FIG. 12 is a perspective view showing a first modified example of a holding member of FIG. 7.
Figure 13:
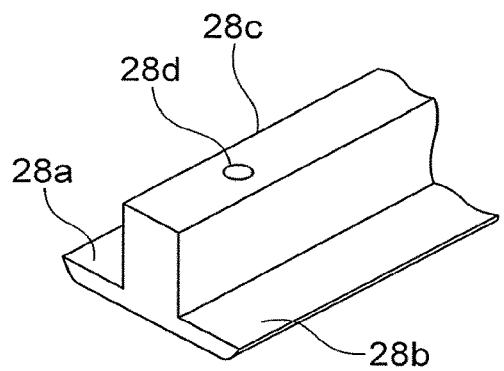
FIG. 13 is a perspective view showing a second modified example of the holding member of FIG. 7.

Furthermore, as shown in FIG. 12, for example, as long as sufficient strength can be secured in the holding members, the fastening portion 28c may be formed from one or a plurality of bosses 27c alone. Conversely, as shown in FIG. 13, an overall thickness dimension of the fastening portion 28c may be increased instead of providing a boss.

Moreover, this invention may also be applied to a landing operation panel for an elevator.

The invention claimed is:

1. An elevator operation panel, comprising a casing having a rear part and a front part that is joined to the rear part,
    wherein the front part includes a frame body and a front surface plate disposed on an opposite side of the frame body to the rear part,
    the frame body includes a first vertical frame disposed on one width direction side and a second vertical frame disposed on another width direction side,
    a fixing member is laid across the first vertical frame and the second vertical frame,
    a holding member for holding the front surface plate on the frame body is fixed to the fixing member, and
    the holding member includes a holding portion that overlaps a vertical direction end portion of a front surface of the front surface plate, and a fastening portion that projects rearward from the holding portion and is screwed to the fixing member.

2. The elevator operation panel according to claim 1, wherein the front surface plate includes a first front surface plate and a second front surface plate disposed on a lower side of the first front surface plate, and
    the holding portion includes a first holding portion that overlaps a lower end portion of the front surface of the first front surface plate, and a second holding portion that overlaps an upper end portion of the front surface of the second front surface plate.

3. The elevator operation panel according to claim 1, wherein a restricting projection is provided on the first and second vertical frames to restrict width direction movement of the front surface plate.

4. The elevator operation panel according to claim 1, wherein a vertical direction gap is provided between the fastening portion and the front surface plate.

5. The elevator operation panel according to claim 1, wherein a screw member holding groove is provided in each of the first and second vertical frames,
    a first screw member is held in each of the screw member holding grooves, and
    the fixing member is fixed to the first and second vertical frames by fastening a second screw member to each of the first screw members.

6. The elevator operation panel according to claim 5, wherein axial direction movement and rotation of the first screw member is restricted by the screw member holding groove, and
    by loosening a fastening between the second screw member and the first screw member, the first screw member can slide through the screw member holding groove in a vertical direction.

7. The elevator operation panel according to claim 1, further comprising:
    an operation panel device provided in the casing,
    wherein:
    the operation panel device is mounted on the fixing member,
    a screw member holding groove is provided in each of the first and second vertical frames,
    a first screw member is held in each of the screw member holding grooves, and
    the fixing member is fixed to the first and second vertical frames by fastening a second screw member to each of the first screw members.

8. The elevator operation panel according to claim 1, wherein a double-sided tape is interposed between the first and second vertical frames and the front surface plate.

9. The elevator operation panel according to claim 1, further comprising:
    an operation panel device in the casing,
    wherein:
    the operation panel device is mounted on the brace,
    the first and second vertical frames each include a groove,
    a first fastener is held in each of the grooves, and
    the brace is fixed to the first and second vertical frames by a second fastener which is fastened to each of the first fasteners.

10. The elevator operation panel according to claim 1, wherein:
    double-sided tape is interposed between the first and second vertical frames and the front surface plate.

11. An elevator operation panel, comprising:
    a casing having a rear and a front that is joined to the rear, wherein:
    the front includes a frame body and a front surface plate disposed on an opposite side of the frame body as the rear,
    the frame body includes a first vertical frame disposed on one width direction side and a second vertical frame disposed on another width direction side,
    a brace connects the first vertical frame and the second vertical frame,
    a cover to hold the front surface plate on the frame body is connected to the brace, and
    the cover includes a first surface that overlaps a vertical direction end portion of a front surface of the front surface plate, and a second surface that projects rearward and is screwed to the brace.

12. The elevator operation panel according to claim 11, wherein the front surface plate includes a first front surface plate and a second front surface plate disposed on a lower side of the first front surface plate, and
    the cover portion includes a first portion that overlaps a lower end portion of the front surface of the first front surface plate, and a second portion that overlaps an upper end portion of the front surface of the second front surface plate.

13. The elevator operation panel according to claim 11, wherein the first and second vertical frames include a projection to restrict width direction movement of the front surface plate.

14. The elevator operation panel according to claim 11, wherein a vertical direction gap is provided between the second surface of the cover and the front surface plate.

15. The elevator operation panel according to claim 11, wherein:
- each of the first and second vertical frames includes a groove,
- a first fastener is held in each of the grooves, and
- the brace is fixed to the first and second vertical frames by fastening a second fastener to each of the first fasteners.

16. The elevator operation panel according to claim 15, wherein:
- axial direction movement and rotation of the first fastener is restricted by the groove, and
- by loosening a fastening between the second fastener and the first fastener, the first fastener can slide through one of the grooves in a vertical direction.

\* \* \* \* \*